US012572527B2

(12) United States Patent
Sanshwe et al.

(10) Patent No.: US 12,572,527 B2
(45) Date of Patent: *Mar. 10, 2026

(54) MULTI-SOURCE DATA SUGGESTION MANAGEMENT

(71) Applicant: Yext, Inc., New York, NY (US)

(72) Inventors: Steven Sanshwe, New York, NY (US); Rajeev Rajagopalan Krithivasan, New York, NY (US); Jamie O'Brien, New York, NY (US); Jesse Shatsky, New York, NY (US); Bryan Reed, Arlington, VA (US); Catherine Frailey, New York, NY (US); Sanket Alekar, New York, NY (US)

(73) Assignee: YEXT, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,182

(22) Filed: Oct. 3, 2023

(65) Prior Publication Data

US 2024/0028585 A1     Jan. 25, 2024

Related U.S. Application Data

(63) Continuation of application No. 17/207,045, filed on Mar. 19, 2021, now Pat. No. 11,809,411.

(Continued)

(51) Int. Cl.
G06F 16/20 (2019.01)
G06F 16/23 (2019.01)

(Continued)

(52) U.S. Cl.
CPC ...... *G06F 16/2379* (2019.01); *G06F 3/04842* (2013.01); *G06Q 10/10* (2013.01); *G06Q 30/0201* (2013.01)

(58) Field of Classification Search
None
See application file for complete search history.

(56) References Cited

U.S. PATENT DOCUMENTS 9,223,989 B2 * 12/2015 Baldwin ............ G06Q 10/1093
2016/0048542 A1    2/2016 Gluzman Peregrine et al.

(Continued)

OTHER PUBLICATIONS

PCT Notification of Transmittal Of The International Search Report And The Written Opinion Of The International Searching Authority for PCT Application No. PCT/US2021/23230, mailed Jun. 8, 2021, 23 pages.

(Continued)

*Primary Examiner* — Belix M Ortiz Ditren
(74) *Attorney, Agent, or Firm* — Jeffri A. Kaminski; Venable LLP

(57) ABSTRACT

Implementations of the disclosure provide a system for managing data suggestions processed by multiple different source systems. A first suggestion associated with first data associated with an entity system is received from a first system. A second suggestion associated with the first data associated with the entity system is received from a second system. An indication of an acceptance of the first suggestion is received from the entity system. The first suggestion is applied to the first data to generate updated first data. The updated first data is transmitted to the first system and the second system.

15 Claims, 9 Drawing Sheets

Related U.S. Application Data

(60) Provisional application No. 62/991,992, filed on Mar. 19, 2020.

(51) Int. Cl.

| | |
|---|---|
| *G06F 3/04842* | (2022.01) |
| *G06Q 10/10* | (2023.01) |
| *G06Q 30/0201* | (2023.01) |

(56) References Cited

U.S. PATENT DOCUMENTS

| | | | | |
|---|---|---|---|---|
| 2016/0171557 A1* | 6/2016 | Fanous | .................. | G06Q 50/01 |
| | | | | 705/14.66 |
| 2019/0158994 A1* | 5/2019 | Gross | ................... | H04W 4/025 |

OTHER PUBLICATIONS

PCT Notification of International Preliminary Report on Patentability for PCT Application No. PCT/US2021/23230, mailed Sep. 29, 2022, 13 pages.

Supplementary European Search Report for EP Application No. 21770839, dated Dec. 6, 2023, 2 pages.

European Office Action in corresponding European Application No. 21 770 839.5 dated Jan. 5, 2024 (8 pages).

* cited by examiner

Figure 5:
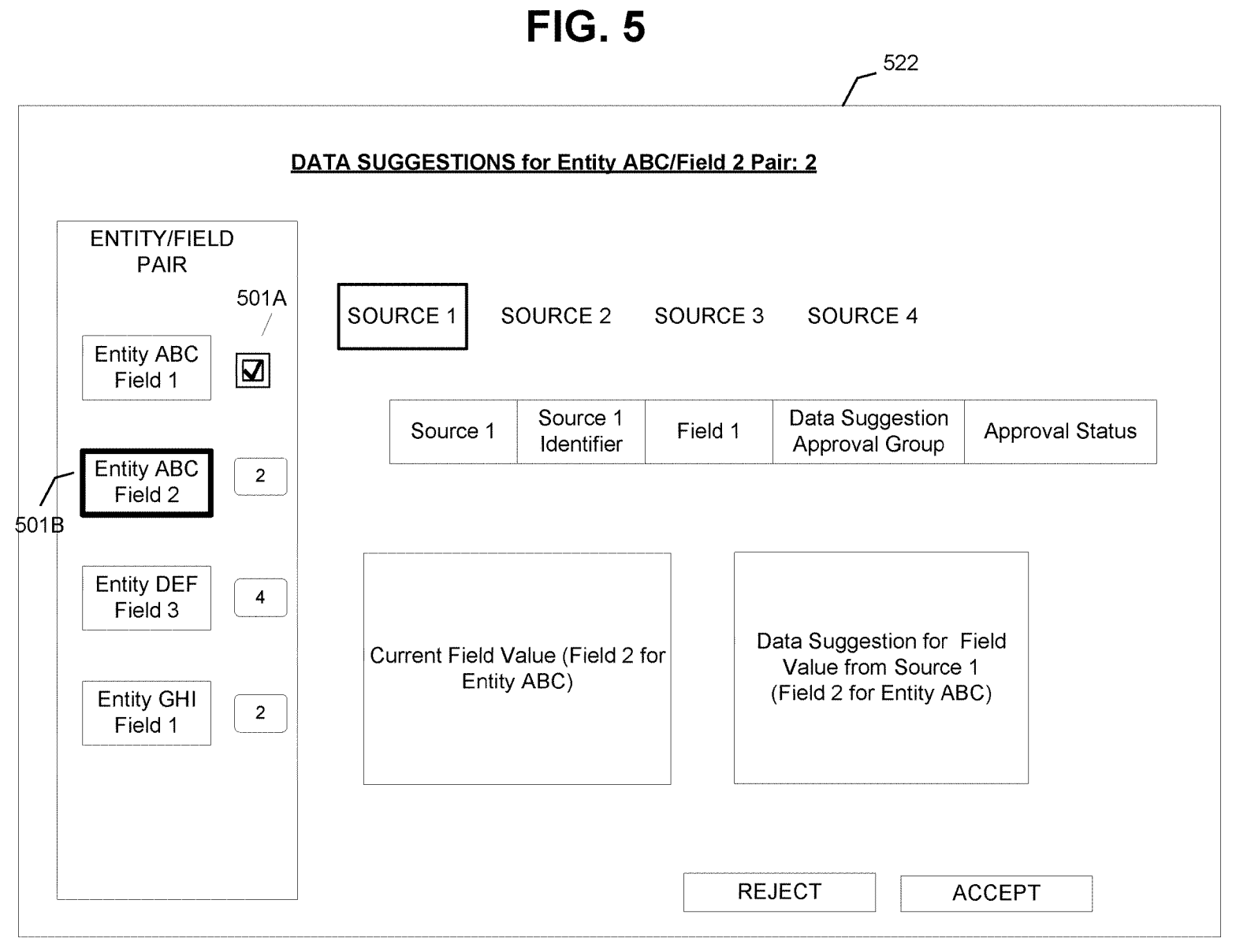

DATA SUGGESTIONS for Entity ABC/Field 2 Pair: 2

ENTITY/FIELD PAIR

501A

Entity ABC Field 1    ☑

Entity ABC Field 2    2    501B

Entity DEF Field 3    4

Entity GHI Field 1    2

SOURCE 1    SOURCE 2    SOURCE 3    SOURCE 4

| Source 1 | Source 1 Identifier | Field 1 | Data Suggestion Approval Group | Approval Status |
|---|---|---|---|---|

Current Field Value (Field 2 for Entity ABC)

Data Suggestion for Field Value from Source 1 (Field 2 for Entity ABC)

REJECT    ACCEPT

Figure 7:
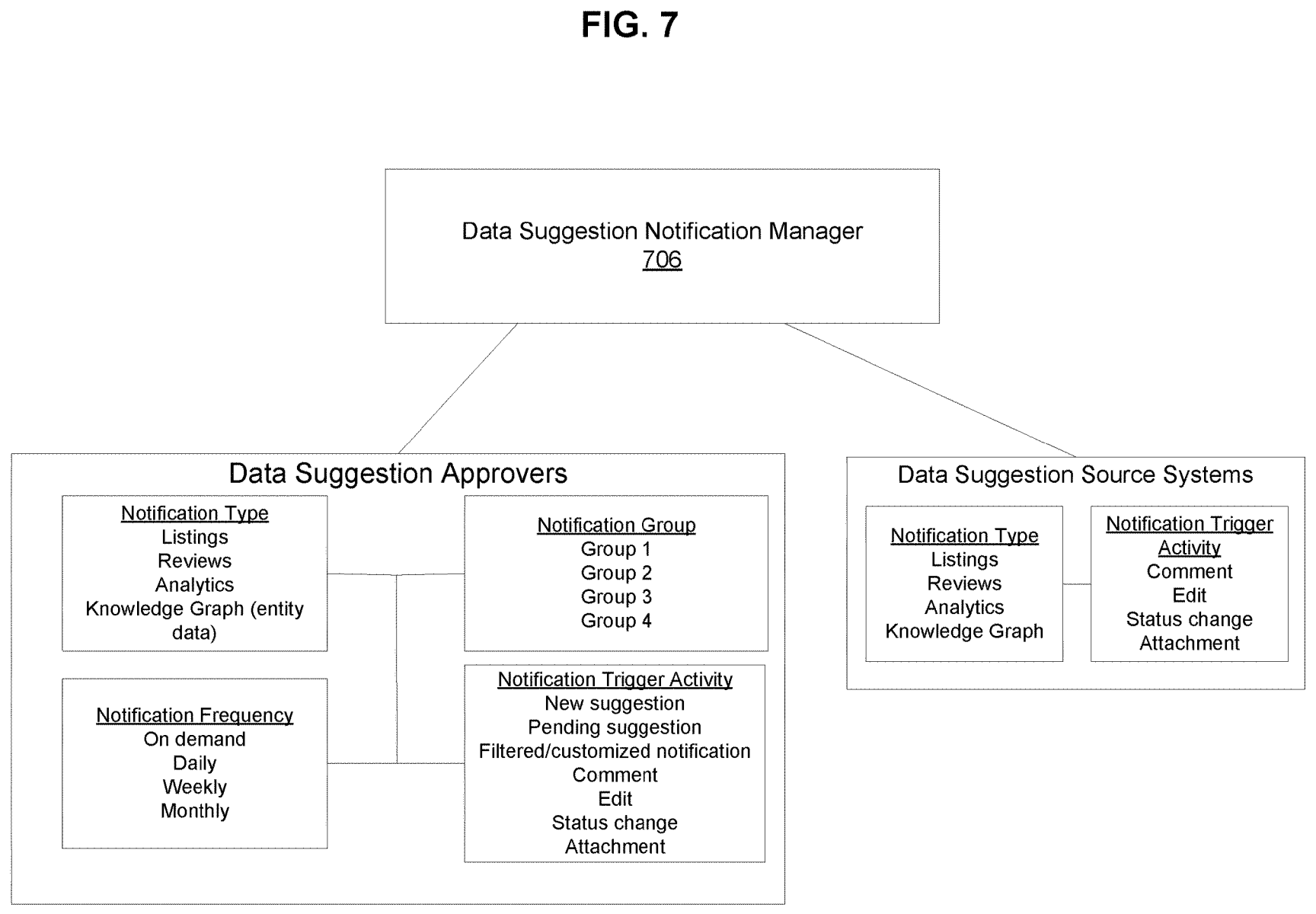

Data Suggestion Notification Manager
706

Data Suggestion Source Systems

Notification Trigger
Activity
Comment
Edit
Status change
Attachment

Notification Type
Listings
Reviews
Analytics
Knowledge Graph

Data Suggestion Approvers

Notification Group
Group 1
Group 2
Group 3
Group 4

Notification Trigger Activity
New suggestion
Pending suggestion
Filtered/customized notification
Comment
Edit
Status change
Attachment

Notification Type
Listings
Reviews
Analytics
Knowledge Graph (entity data)

Notification Frequency
On demand
Daily
Weekly
Monthly

FIG. 8

800

Identify a first indication associated with a first source system of a plurality of source systems, the first indication corresponding to a first data suggestion associated with a first portion of entity data associated with an entity system
810

Identify a second indication associated with a second source system of the plurality of source systems, the second indication corresponding to a second data suggestion associated with the first portion of the entity data associated with the entity system
820

Generate an interface comprising an integrated set of data suggestions, wherein the integrated set of data suggestions comprises the first data suggestion and the second data suggestion
830

Receive, via the interface, input data from the entity system, wherein the input data indicates an acceptance of the first data suggestion
840

Apply the first data suggestion to the first portion of the entity data
850

Store an updated first portion of the entity data comprising the first data suggestion applied to the first portion of the entity data
860

MULTI-SOURCE DATA SUGGESTION MANAGEMENT

CROSS-REFERENCE TO RELATED APPLICATION

This is a continuation application of U.S. patent application Ser. No. 17/207,045, filed Mar. 19, 2021, which in turns claims the benefit of U.S. Provisional Application No. 62/991,992, filed Mar. 19, 2020, the entire disclosure of which is incorporated herein by this reference.

TECHNICAL FIELD

The disclosure relates generally to online data management, and more particularly, to methods and systems to manage data suggestions relating to an entity received from multiple source systems.

BACKGROUND

Various online services are available to locate and find listings about certain businesses and services (i.e., business listing information associated with a merchant or entity). One of the challenges in providing business listings in an online or network computing environment is ensuring that the listings include data that is accurate and properly updated. Incorrect, inconsistent, or inaccurate (e.g., stale or not updated) in the listing profile associated with a merchant can result in lost business opportunities and customer dissatisfaction.

BRIEF DESCRIPTION OF THE DRAWINGS

The present disclosure is illustrated by way of example, and not by way of limitation, and can be more fully understood with reference to the following detailed description when considered in connection with the figures as described below.

FIG. 1 illustrates an example of a computing environment including a data suggestion management system to manage data suggestions associated with one or more entity systems provisioned by multiple data suggestion source systems in accordance with one or more aspects of the present disclosure.

FIG. 5 illustrates an example interface generated by a data suggestion management system in accordance with implementations of the present disclosure.

FIG. 7 illustrates an example data suggestion notification manager for managing notifications relating to data suggestions in accordance with implementations of the disclosure.

FIG. 8 illustrates an example method for managing multiple data suggestions provisioned by multiple data suggestion sources in accordance with implementations of the present disclosure.

DETAILED DESCRIPTION

Figure 2:
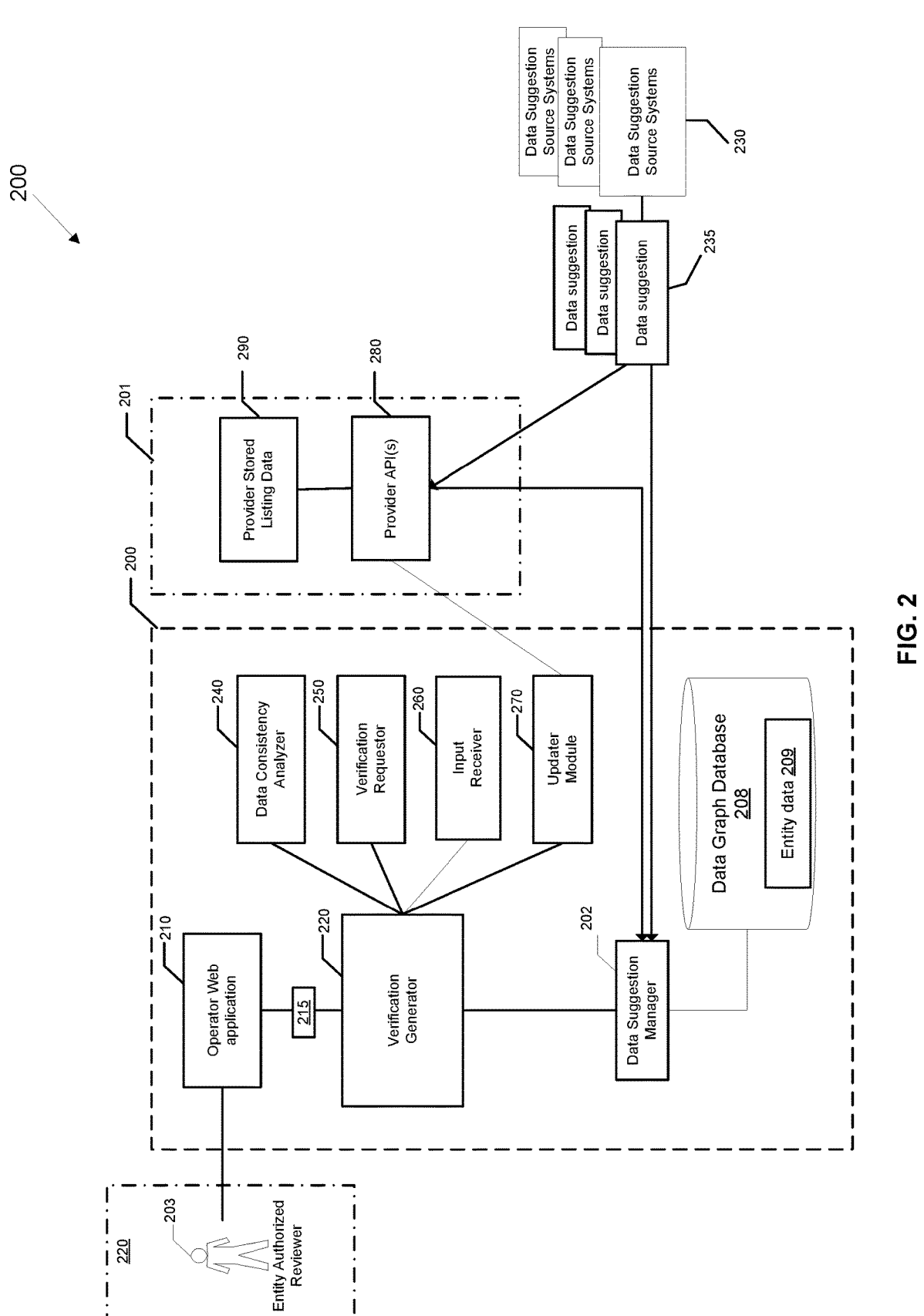
FIG. 2 illustrates an example of a computing environment including a data suggestion management system to manage a verification process relating to data suggestions associated with one or more entity systems provisioned by multiple data suggestion source systems in accordance with one or more aspects of the present disclosure.

The management of data associated with an entity (e.g., a merchant or business) provisioned via multiple different electronic systems (also referred to as publisher systems) in an electronic environment (e.g., web-based or application-based content provisioning environments) can be challenging due to the continual need to maintain accurate, complete, and uniform information across the multiple publisher systems. The need to efficiently manage data relating to an entity is of particular importance as it relates to the ability for a consumer (e.g., an end-user or end-user system) to use electronic resources to obtain information about the entity. Since there are multiple different publisher systems through which entity data is published to the multiple end-user systems, it is necessary for the entity to have accurate, complete, up-to-date, and uniform data provisioned to end-user systems through the many available publisher systems.

Correcting incorrect information or provisioning updated information in a business listing is problematic because many publisher systems may not be aware of errors or changes in the entity information. For an entity or publisher system associated with publishing facts or information about the entity (also referred to as "entity data", "knowledge" or "knowledge information" associated with an entity; such as information associated with an entity's business listing) to determine whether the entity data is incorrect can be a time consuming process. In this regard, reviewing each instance of entity data electronically stored and provisioning across multiple different publisher systems (e.g., search engines, websites, applications, etc.) requires an excessive amount of time for an entity. Furthermore, a publisher system may be required to review many different entity data instances (e.g., entity business listings, profiles, information cards, etc.) while running the risk of publishing entity data to an end-user system (e.g., in response to a search query relating to an entity that is submitted by an end-user system) containing incorrect, inaccurate, incomplete, or stale information, particularly in cases where the underlying information has undergone a change, update, replacement, or enhancement via one or more other systems.

Aspects of the present disclosure relate to systems and methods to enable an entity (also referred to as an "entity system") to manage suggestions relating to entity data (herein referred to as "data suggestions") received from multiple different systems (herein referred to as "data suggestion source systems" or "source systems"). According to embodiments, the system of the present disclosure (herein referred to as a "data suggestion management system") is provided to identify, collect, and manage data suggestions from multiple different source systems (e.g., internally-derived suggestions processed by the entity system, data suggestions generated by the data suggestion management system, data suggestions from end-user systems (e.g., consumers), data suggestions from publisher systems (e.g., search engines, third-party applications, third-party websites, etc.). According to embodiments, the collection of data suggestions from multiple different source systems and integrate the multi-source data suggestions for display via one or more interfaces to allow users (e.g., users of the entity system) to approve or decline those data suggestions. In an embodiment, the data suggestion management system is configured to transmit updated entity data including an approved data suggestion to one or more of the publisher systems in response to an approval of the data suggestion. Therefore, updated entity data is pushed to publisher systems and one or more entity data provisioning modules of the data suggestion management system.

Figure 1:
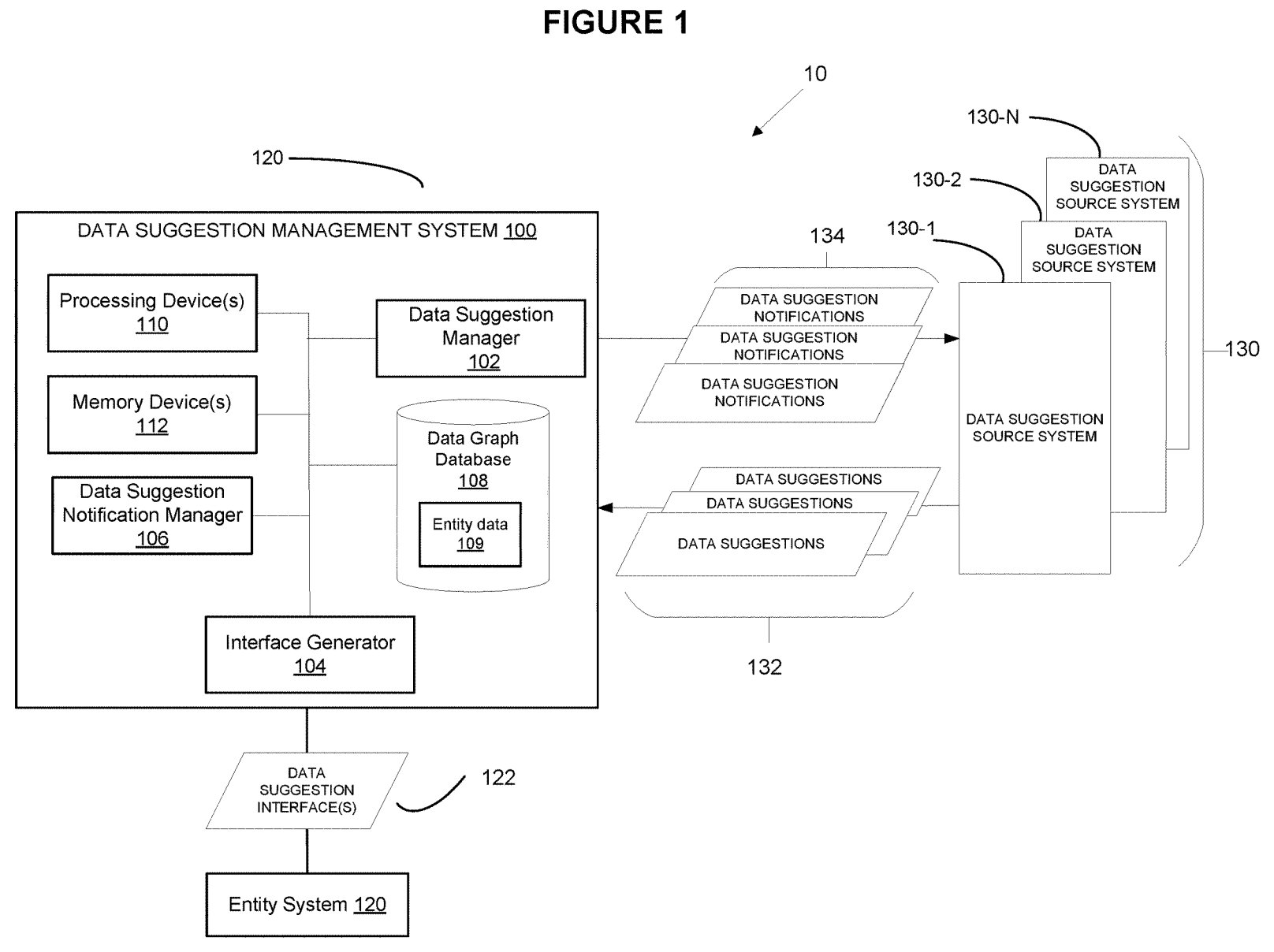

FIG. 1 illustrates an example of computing environment 10 including a data suggestion management system 100 according to embodiments of the present disclosure. The data suggestion management system 100 communicatively couples with one or more entity systems 120 and a set of multiple different data suggestion source systems 130-1 through 130-N (collectively referred to as "data source systems 130" or "source systems 130") via one or more communication networks. According to embodiments, the data suggestion management system 100 is a computing system or platform including one or more modules, sub-systems, data stores, programs, etc. configured to perform functionality and operations relating to the management of data suggestions relating to entity data that are processed via the set of source systems 130. According to embodiments, the term "system", "computing system" or "computer platform" is intended to include any data processing device, such as a desktop computer, a laptop computer, a tablet computer, a mainframe computer, a server, a handheld device, a digital signal processor (DSP), an embedded processor, or any other device able to process data. The data suggestion management system 100 is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

In an embodiment, the data suggestion management system 100 includes a data suggestion manager 102, an interface generator 104, a data suggestion notification manager 106, a data graph database 108, one or more processing devices 110, and one or more memory devices 112. According to embodiments, the data suggestion management system 100 identifies, collects, and manages data suggestions 132 generated by the multiple source systems 130. The data suggestions 132 include one or more edits, additions, updates, revises, deletions, or any other change to data associated with the entity system 120 (e.g., entity data 109). In an embodiment, a data suggestion 132 can include a proposed update, addition, edit or change (collectively referred to as a "suggestion") to a data field of a data record associated with an entity. In an embodiment, each data suggestion corresponds to an entity-field pair received from one of the multiple source systems 130.

In an embodiment, a data suggestion 132 can be a structured set of information relating to the proposed update to the entity-field pair organized in a schema including one or more data elements and values. The elements of the data suggestions can include, but are not limited to, information identifying the entity, the field associated with the proposed update, a unique data suggestion identifier, a unique entity identifier, a source system identifier, an identifier associated with a review group or individual (e.g., the system that approved or rejected the data suggestion), a status of the data suggestion (e.g., pending, approved, rejected, canceled), a date/time associated with the data suggestion, a last update data identifying a date/time the data suggestion was last updated, etc.

In an embodiment, the source systems 130 can include one or more publisher systems (e.g., websites, applications, search engines, etc. that publish the entity data to end-user systems), the entity system 120, one or more end-user systems (e.g., systems associated with a consumer), or any other suitable system configured to process a data suggestion relating to the entity data. For example, the source systems 130 can include a user associated with the entity system 120 (e.g., an employee of an entity system 120 managing the information), a publisher system, an end-user system (e.g., a customer of the entity), etc.

In an embodiment, the data suggestion manager 106 identifies, collects, and processes the data suggestions 132 generated by or via the source systems 130. In an embodiment, the data suggestion manager 106 is configured to generate one or more data suggestions relating to the entity data 109 (e.g., the data suggestion management system 100 can be a source system to generate one or more data suggestions).

In an embodiment, the interface generator 104 generates one or more computer-based interfaces (referred to as "data suggestion interfaces 122") for electronic interactions with the entity system 120 relating to the management of the multiple data suggestions 132 from multiple source systems 130 relating to the entity data 109. In an embodiment, the interface generator 104 generates interfaces that enable users of the entity system 120 (e.g., an owner of the business listing to which a data suggestion relates) to view, approve and reject the data suggestions provided from the multiple source systems 130. In an embodiment, an entity or entity system 120 may refer to a commercial entity, such as a business or a sole proprietorship, for which publisher systems may provide listing information in response to an end-user online search or query.

In an embodiment, the data suggestion interfaces 122 can present the data suggestions associated with the entity data to the entity system for review and consideration. In an embodiment, the data suggestion interfaces 122 can collect information, selection, indications, or other suitable interactions relating to the data suggestions 132, such as an approval indication, a rejection indication, or an edit and approve indication (e.g., a data suggestion 130 that is edited or modified by the entity system 120 and then approved). In an embodiment, the data suggestion can be in an approved state, wherein the data suggestion is identified as having a value that is correct and approved (also referred to as an "approved" suggestion). In an embodiment, a data suggestion can be in a rejected state (referred to as a "rejected" suggestion), wherein the data suggestion is identified having a value that is incorrect or not preferred. In an embodiment, the data suggestion can be in a pending state, wherein a data suggestion is received but has not yet been acted on by a user (also referred to as a "pending suggestion" or a "requested suggestion"). In an embodiment, the data suggestion can be in a canceled state, wherein the data suggestion is determined to be no longer valid. A data suggestion can enter the canceled state if a source system 130 associated with a data suggestion 132 elects to cancel the data suggestion, a source system 130 decided to cancel/expire it, or the source system 130 decides to retract the suggestion for any reason. In an embodiment, the data suggestion can include a completed edit group including a grouping of edits (e.g., edits for a given (entity, field) pair) that reached a terminal or completed state (e.g., approved, rejected, or canceled.)

In an embodiment, the data suggestion management system 100 includes one or more data graph databases 108 storing the entity data 109 (e.g., an updated state of the entity data 109 associated with the entity system 120 including one or more processed and approved data suggestions 132). In an embodiment, the entity data 109 is maintained in a data graph structure (also referred to as a "knowledge graph"). It is noted that the data graph database 108 can include data associated with multiple different entity systems, wherein respective data for each of the entity systems is organized and structured in a corresponding knowledge graph.

In an embodiment, the data suggestion notification manager 106 is configured to manage and generate notifications (e.g., communications) relating to the data suggestions 132 to be transmitted or sent to the entity system 120 (e.g. a notification relating to the review of a data suggestion 132) and the source systems 130 (e.g., a notification or prompt relating to the processing of a data suggestion 132), as described in greater detail below. According to embodiments, the data suggestion notification manager 106 can managed and execute one or more notification routing rules or filters to determine and identify one or more groups (e.g., sets of one or more entity-users) to receive a notification relating to a data suggestion. In an embodiment, the routing rules can be configured and executed to generate and transmit one or more notifications to one or more notification groups based on a type of data suggestion to be reviewed. In an embodiment, the type of data suggestion can be defined by an entity associated with the data suggestion, a field that is the subject of the data suggestion, etc. According to an embodiment, the data suggestion notification manager 106 can manage the set of rules to determine associations or mappings between a data suggestion pending review and one or more groups that are to be notified of the data suggestion.

According to embodiments, the data suggestion management system 100 enables a verification process for verifying data suggestions 132 from the multiple source systems 130. In an embodiment, the verification process can be initiated or triggered by the data suggestion notification manager 106 using one or more notifications or prompts to the entity system 120 relating to potential or pending data suggestions. Implementations of the data suggestion management system 100 enable one or more of the source systems 130 (e.g., online publishers such as Google™, Facebook, Yelp, etc.) to receive data suggestion submissions from end-users (e.g., users of the publisher systems) with a data suggestion relating to the entity data 109. In an embodiment, since the source system 130 may not be the originator of a data suggestion, the data suggestion management system 100 can provide the source system 130 with one or more mechanisms or tools to verify the data suggestion. To this end, the techniques provided herein allow the entity system 120, in some embodiments, to view those data suggestions, and choose whether or not to incorporate them across their online presence. This allows an entity system 120 control over their entity data 109 that appears online or via applications about that entity system by correcting inaccuracies that can confuse end-users (e.g., customers). These techniques also deliver real-time updates for enhanced content like photos and special offers provided by the entity system 120 and provide a way to optimize location data for the entity that is provided by the source systems 130 (e.g., online publisher systems).

In an embodiment, in order to access the services of the data suggestion management system 100 of FIG. 1, the entity system 120 may register for an account with the data suggestion management system 100. In some implementations, the entity system 120 may access an application programming interface (API) associated with the data suggestion management system 100 to enter information corresponding to entity data 109 that may be provisioned by or to the multiple source systems 130. The entity data 109 can include a set of data fields and values, including example fields corresponding to an entity name, address, telephone number, a link to a website for the entity, a pointer to a map of the location of the entity, the entity location on a map, a promotional message for the entity, and a list of information regarding personal and product offerings of the entity, which may include, but not limited to, menus, products services, upcoming and past events, etc. In an embodiment, one or more of the source systems 130 (e.g., publisher systems) may host a computer platform that provides a plurality of modules (e.g., APIs) with which the data suggestion management system 100 interacts for carrying out operations and managing the data suggestions 132.

In some implementations, the data suggestion management system 100 can provide a listing regarding the entity system 120 to at least a portion of the source systems 130 (e.g., publisher systems, search service provider systems, etc.) to ensure that the entity data 109 and corresponding online presence is consistent and uniform across the multiple data provisioning source systems 130. In this regard, the entity system 120 can use the data suggestion management system 100 to manage the entity data and corresponding data suggestions 132 to generate and disseminate a common listing or data profile that is propagated by the data suggestion management system 100 in real or near-real time to at least a portion of the source systems 130. In an embodiment, the data suggestion management system 100 can manage the entity data 109 to generate a new listing or to modify an existing listing. Each entity listing may be indexed and stored by the data suggestion management system 100 in the data graph database 108 to enable at least portion of the source systems 130 to access and obtain the listing information via a network communication.

In other implementations, a source system 130 may obtain a signal or indication regarding a data suggestion relating to the entity data 109 from a different system. For example, a visitor to a location associated with the entity system 120 may notice that the hours of operations have changed for the entity from what is posted online. In this example, the entity may have changed its operating hours due to a holiday and did not update this information with the data suggestion management system 100. The visitor may post a message via the source system 130 indicating the change in the entity's hours of operation. The data suggestion management system 100 may identify the data suggestion 132 using a data suggestion collection mechanism, such as a Web crawler application (e.g., a software application that browses the Internet in a methodical, automated manner to discovery web pages and information stored thereon) configured to periodically check source systems 130 (e.g., websites, social media platforms, etc.) for data suggestions 132.

In some implementations, the data suggestion management system 100 may directly receive the data suggestion 132 from a source system 130. In turn, the data suggestion management system 100 may send a communication to the entity system 120 to determine if change of the entity data 109 in view of the data suggestion 132 is approved.

In an embodiment, the data suggestion management system 100, which may manage data from a plurality of entities, may automatically make data predictions and automatically provide those predictions as data suggestions to entity system 120. In some implementations, this is done by analyzing data from all entities that data suggestion management system 100 manages, including the data suggestions that those entities have received and/or has approved. In other implementations the data from just the entities in the same vertical may be analyzed, other data from entity system 120 may be analyzed or any combination of the forgoing. In other implementations, the information is pulled from third party-sources instead of or in addition to entities that use the data suggestion management system 100. For example, the data suggestion management system 100 may determine that all car dealership entities being managed by the data suggestion management system 100 approve data suggestions 132 that their locations would be closed on Christmas. In the event that entity system 120 may be a car dealership, the data suggestion management system 100 may automatically suggest the following data suggestion: "Closed for Christmas Holiday Hours." In other embodiments, attributes may also be suggested by the data suggestion management system 100 to entity system 120 based on attributes from other entities. For example, if an insurance entity recently approved a "hurricane coverage attribute", that attribute can be suggested by the data suggestion management system 100 to the entity system 120. In other embodiments, the data suggestions 132 can be shared based on the relationship between the entity system 120 and another entity. For example, if a bank has an ATM in store A, and that bank recently updated the number of ATMs in store A, that update can be suggested by the data suggestion management system 100 to the entity system 120. In other embodiments, data suggestion management system 100 can generically look either across accounts or within individual accounts for correlation patterns and see if trends emerge. For example, a majority of restaurant entities where "Meals Served" includes "Breakfast" also have "Attire" set to "Casual."

In embodiment, the interface generator 120 can generate one or more data suggestion interfaces 122 including an integrated display and presentation of a collection of data suggestions collected from multiple different source systems 130. In an embodiment, the interface generator 120 can generate a data suggestion interface 122 including a "data suggestions" tab or filter associated with the entity data 109 associated with and managed on behalf of the entity system 120. In an embodiment, the data suggestion interface 122 enables users of the entity system 120 to review a collection of pending data suggestions that have been aggregated from the multiple source systems 130, including end-user systems and publisher systems. In an embodiment, the data suggestion interfaces 122 displays data suggestions 132 from the multiple different source systems in a single interface and enable filtering and searching of the data suggestions 132.

Figure 3:
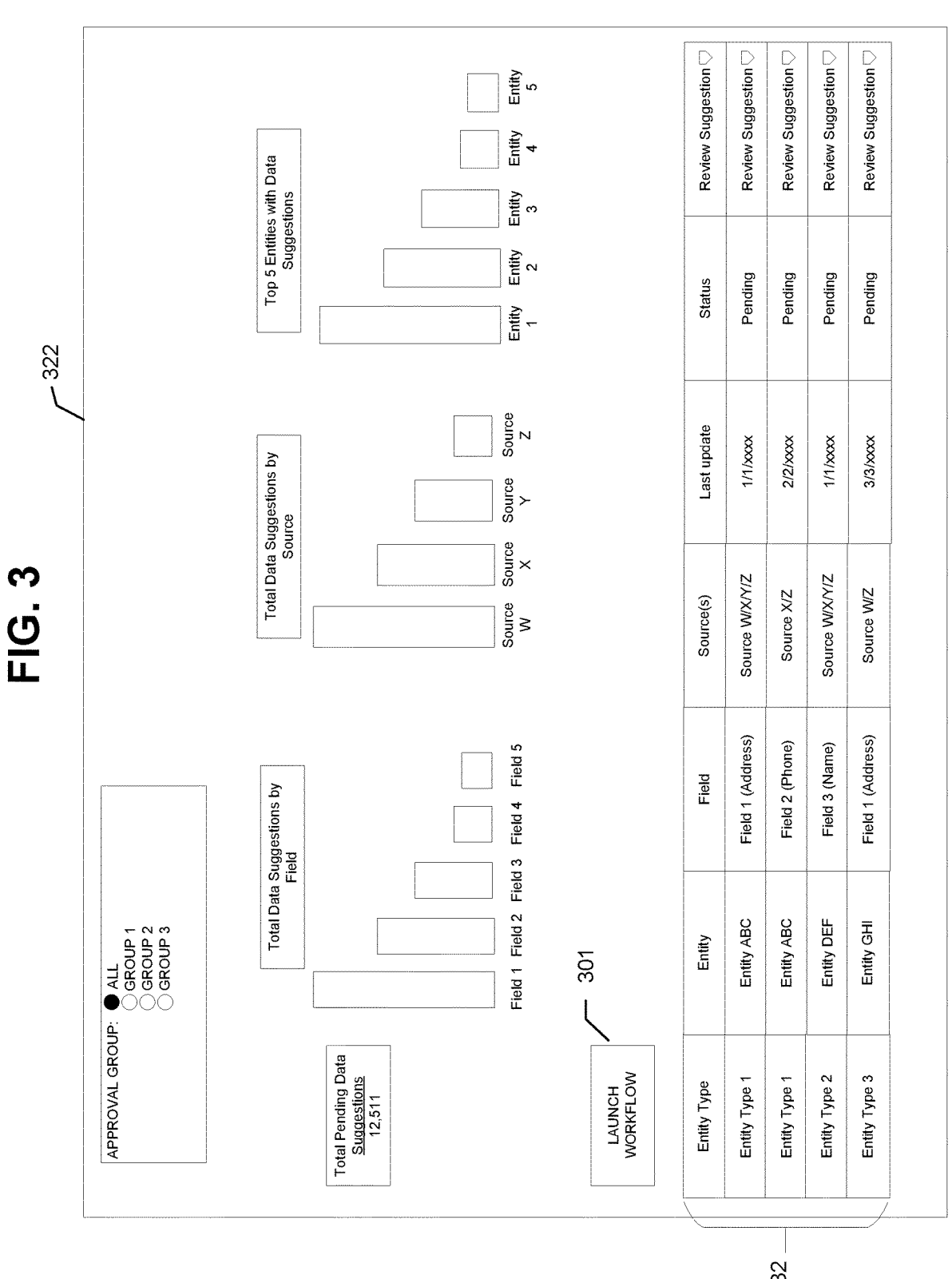
FIG. 3 illustrates an example interface generated by a data suggestion management system in accordance with implementations of the present disclosure.

FIG. 3 illustrates an example data suggestion interface 322 including a set of multiple data suggestions 332 relating to an entity. As shown, the interface 322 includes data elements relating to each of the data suggestions 332, such as, an entity type (e.g., a location or sub-entity of the entity), an entity identifier, a field identifier (e.g., address, phone, name, etc.), a source identifier (e.g., source system W, source system X, source system Y, and source system Z, etc.), a last update value (e.g., a date of a last update of the data suggestion), a status of the data suggestion (e.g., pending, approved, rejected, canceled), and a "review suggestion" option.

As shown in FIG. 3, the interface 322 can include a set of analytics relating to a set of data suggestions associated entity system. For example, configurable analytics relating to the data suggestions can include a bar graph indicating a total number of data suggest by field, a bar graph indicating a total number of data suggestions by source system, and a ranking of top N number (e.g., five) entities or sub-entities associated with data suggestions.

In an embodiment, the interface 322 can present one or more possible values for the field before selecting one (or none) of the data suggestions. Displaying the data suggestions in a structured format (e.g., a table) enables the user to take in the full context before making a decision and make the task of working through all individual data suggestions 332 more manageable.

In an embodiment, in the organized structure (e.g., table) of data suggestions 322, data suggestions that are in a "Pending" state can be grouped by entity-field pair. If a given (entity, field) pair has more than one Pending edit, the various source systems of those edits can be listed in the source(s) column. If a new data suggestion enters the system for an entity-field pair that have one or more existing pending data suggestions, the corresponding row can be updated to include the new data suggestion and associated source system. In an embodiment, data suggestions in a terminal state (e.g., approved, rejected, canceled) can be group (e.g., a completed edit group) to enable a user to approve one edit and reject others in the same interaction, and show the history and context of these actions via the integrated interface 322.

In an embodiment, the interface 322 can include an indication of the one or more approval groups associated with the data suggestions 332. In the example shown in FIG. 3, the "all" approval groups view is selected. In an embodiment, the data suggestions can be filtered by one or more specific approval groups (e.g., group 1, group 2, group 3) to display a corresponding subset of data suggestions that are marked for review by that specific approval group.

In an embodiment, one or more of the data suggestions can be reassigned from approval group (e.g., one user) to another user or approval group. In an embodiment, a "reassign" option can be provided via the interface 322 (e.g., a selectable option following the selection of a "review suggestion" icon associated with a respective data suggestion). In an embodiment, if a user chooses to reassign a data suggestion, the user can be prompted with a modal (e.g., a prompt or pop-up window) with a request for an indication from the user confirming the user wants to reassign the individual data suggestion, or all data suggestions for that entity-field pair. After reassigning, the data suggestions can remain in the pending state.

In an embodiment, the interface 322 can include a "launch workflow" option 301 to enable users to view and work through groups of suggested edits based on filters or individual selection. While users can choose to enter the "workflow" mode for all pending data suggestions, this can be especially powerful for users who want to think about all data suggestions one entity or one field at a time, as they can filter to that specific entity or specific field and launch a workflow for those specific, filtered data suggestions. A user can also select an arbitrary set of data suggestions by selecting them from the table and selecting the "launch workflow" option 301 for the selected rows.

Figure 4:
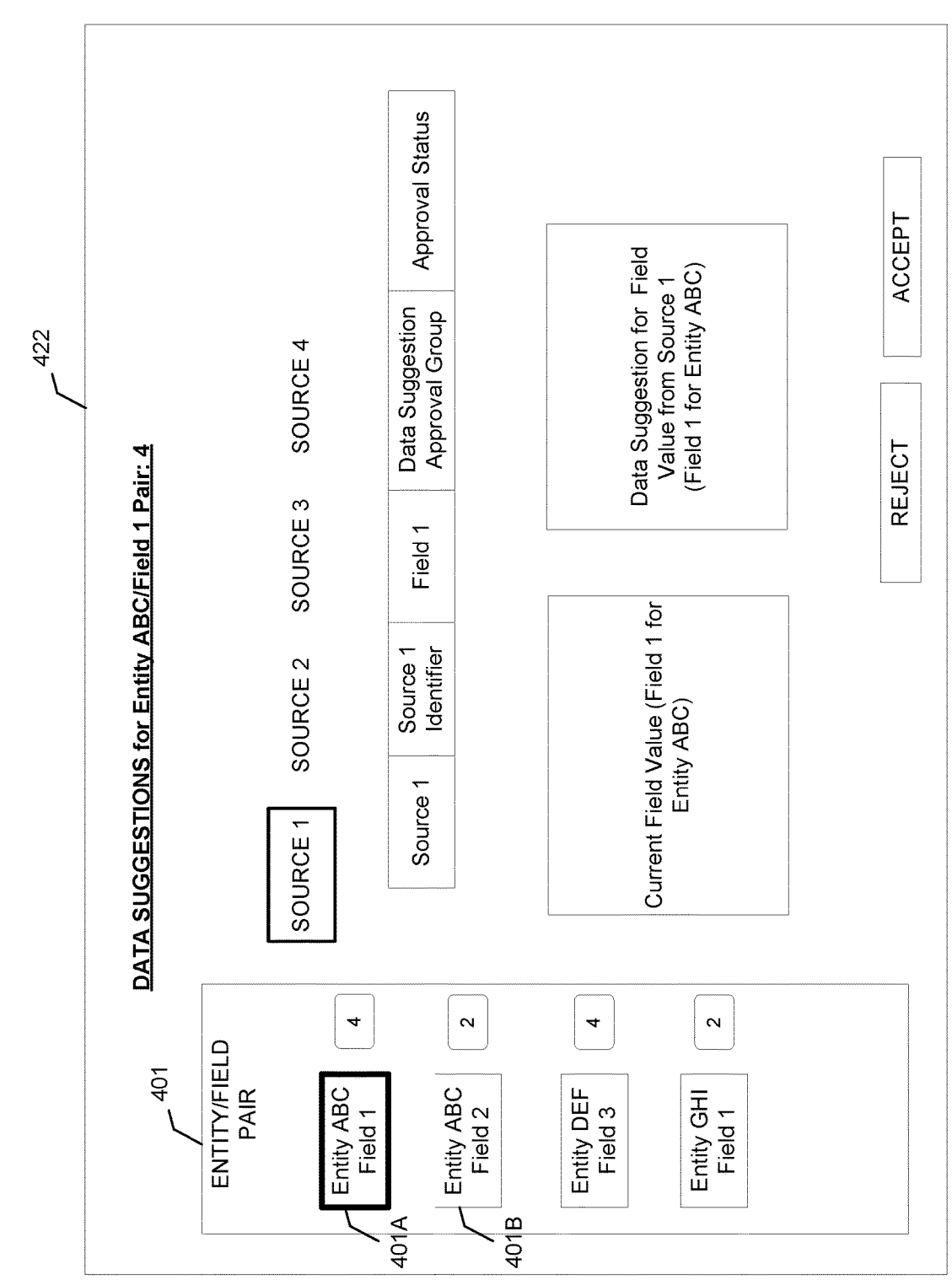
FIG. 4 illustrates an example interface generated by a data suggestion management system in accordance with implementations of the disclosure.

FIG. 4 illustrates an example interface 422 generated in response to the selection of the launch workflow icon 301 of FIG. 3. As shown, the interface 422 (also referred to as a "workflow page") includes a list of all suggested edits grouped by entity-field pairs in portion 401. In an embodiment, in response to a selection of an entity-field pair (e.g., the entity ABC-field 1 pair), the corresponding data suggestions are displayed. In an embodiment, the interface 422 can include a filter bar that can match a filter bar associated with interface 322. If the user had chosen an arbitrary selection of items, those may not be represented in the filter bar, as the arbitrarily selected data suggestions may not match a set of filters. At any point, a user could choose to re-filter to view a different set of data suggestions.

As the user views each group of data suggestions associated with a selected entity-field pair, the user can select one or more of the data suggestions to accept (i.e., approve) or reject. In an embodiment, the interface 422 can enable a user to reject all other pending data suggestions for the entity-field pairs unless they specifically choose to not have the other data suggestions rejected. Alternatively, in an embodiment, the user can choose to reject all of the data suggestions.

In an embodiment, once the user has approved one of the data suggestions or rejected all of the data suggestions associated with an entity-field pair (e.g., entity-field pair 401A in FIG. 4), the user can navigate to and select a next item 401B in the workflow (e.g., entity ABC-Field 2). As shown in interface 522 of FIG. 5, the previous entity-field pair (e.g., 401A of FIG. 4) is marked as completed 501A and the data suggestion set under review is highlighted 501B. Each completed item in the list can be identified as a completed edit group. In an embodiment, if any edits or data suggestion groups no longer match the filter (e.g. if the status is pending and some groups are completed, upon refreshing the interface 422, 522 or sharing a corresponding universal resource locator (URL), those items are no longer included in the list. In an embodiment, advantageously, the workflow page provides a direct link to a list of specific data suggestions, which is useful for centrally managing tasks via one or more interfaces associated with directing a user to take specific action on a specific set of items.

In an embodiment, a designated user (e.g., a location manager) associated with the entity system 120 may be provided with an interface (e.g., interface 422 of FIG. 4) for approving or rejecting the data suggestions collected and integrated from multiple source systems. The location manager, in one implementation, is a user of the data suggestion management system 100 with authority to manage the location data for the entity system 120. For example, an entity system 120 may assign a regional vice president having responsibility for stores in a particular region, or, more specifically, to a specific store manager to handle suggestions that pertain to that manager's store. The location manager may receive a notification of pending data suggestion from the data suggestion management system 100, for example, on a dashboard of an interface. This dashboard may be periodically updated so that when the location manager logs in, the user can be reminded of how many pending suggestions they have in queue to be reviewed.

After a review of a pending data suggestion, if the location manager associated with the entity system 120 indicates that the data suggestion is incorrect, the data suggestion management system 100 continues to ensure that the entity's original data is maintained on the computer platform of the search service provider systems and publisher systems. If the location manager indicates that the data suggestion is approved, then the data suggestion management system 100 may update this information on its internal system (e.g. the entity data stored in the data graph database), update data on one or more webpages or applications, and update results returned in response to end-user search queries. In an embodiment, the update can trigger a communication to at least a portion of the source systems in the network for them to update their information related to the entity system 120. The update communication ensures that the entity data provided by the source systems are updated and correct, in accordance with the approved data suggestion. In an embodiment, the data suggestion management system 100 can automatically add missing entity data and update critical fields like name, address, phone number, and other categories across the multiple different source systems 130 within the environment 10.

In some implementations, the data suggestion management system 100 may implement certain rules for manipulating the status field of a data structure of a data suggestion. For example, the status field of the data structure may have an initial "PENDING ACTION" indicator that changes once the suggestion is acted upon by a user. If the status field of suggestion is "ACCEPTED," this indicates the suggestion was accepted by a user. As a result, data associated with the data suggestion is updated in the data graph database 108 and this update is then delivered to one or more of the source systems 130. If the status field of the data suggestion is "REJECTED," this indicates that the data suggestion was rejected by the user. In this regard, data for the entity system 120 is not updated in the data suggestion management system 100 and no source systems 130 are updated. If the status field of the data suggestion is "CANCELED," this may indicate that another data suggestion is received that may override a first or previous data suggestion. For example, a first suggestion may be received that the entity's name should be changed from "entity ABC" to "entity ABCD." While that change is pending with the location manager, a second data suggestion may be received that the entity's name should be entity ABCE." In this example, the status for the first data suggestion is set to CANCELED and a new pending suggestion for the entity is added for the "entity ABCE" name change. If the status field of suggestion is "INVALID," this indicates the received a suggestion may be for a field this not updatable on the one or more source systems 130. If the status field of suggestion is "IGNORED," this indicates the data suggestion management system 100 determined that the suggestion should not be considered, for example, the difference between original data and the change is very minor or insignificant. If the status field of suggestion is "REPEATED," this indicates a suggestion was received from a publisher 130, and the data suggestion management system 100 already has the exact same suggestion in the NEW status from that publisher 130. In this case the new suggestion is recorded with the status REPEATED.

FIG. 2 illustrates an example data suggestion management system 200 configured to verify data suggestions in accordance with one or more aspects of the disclosure. The data suggestion management system 200 may be executed on one or more computer platforms interconnected by one or more networks, which may include the Internet. In an embodiment, the data suggestion management system 200 includes a data graph database 208 storing entity data 209 associated with an entity system 220 and multiple executable software modules 210, 220, 230, 240, 250, 260 and 270 that are communicatively connected with one or more entity systems 220, and a plurality of service provider computer platforms 201 (e.g. data service provider such as a publisher system, search service providers (e.g., search engines), or other systems configured to provision entity data 209). In an embodiment, each service provider computer system 201 can also be a data suggestion source system 230, as described in detail above.

Each of the service provider computer platforms 201 provides a plurality of APIs 280 with which the data suggestion management system 200 interacts for carrying out operations and providing and retrieving provider stored listing data 290 between the data suggestion management system 200 and the service provider computer platforms 201 regarding listing information 115, for example, from an entity system 220. In that regard, the data suggestion management system 200 can provide a listing regarding an entity associated with the entity system 220 to all of the service provider computer platforms 201 to ensure that the entity's online presence is consistently known on the Internet. The data suggestion management system 200 may receive a portion of the entity data 209 from the entity system 220 for the purpose of creating a new listing or to modify an existing listing or other format or structure of the entity data that can be provisioned by one or more of the service provider computer platforms 201. Each element of the entity data 209 may be indexed and stored by the data suggestion management system 200 in the data graph database 208 so that the service provider computer platforms 201 and other users of the data suggestion management system 200 may access the entries to obtain the listing information via, for example, one or more network communications.

In an embodiment, to access the services of the data suggestion management system 200, an entity authorized reviewer 203 (such as a location manager) associated with the entity system 220 may be provided with an operator web application 210. The operator web application 210 (e.g., a set of one or more interfaces generated by the data suggestion management system 200) allows the reviewer 203 to monitor and interact with data suggestions that are in queue to be authorized by the manager. The reviewer 203, in one implementation, is an authorized user of the data suggestion management system 200 with authority to manage the location data for the entity system 220. For example, an entity system 220 may assign a regional vice president who might have all the information for stores in a particular region, or, more specifically, to a specific store manager to handle suggestions that pertain to that manager's store. The location manager may receive a notification of pending suggestion data via the operator web application 210. This operator web application 210 may be periodically updated so that when the reviewer 203 logs in, they can be reminded of how many pending suggestions they have in queue to be reviewed.

With respect to FIG. 2, the data suggestion management system 200 includes a verification generator 220. The verification generator 220 may implement the by the data suggestion management system 100 of FIG. 1 to process one or more data suggestions 235 received from one or more of the multiple data suggestion sources 230. The verification generator 220 may interact with several modules of the data suggestion management system 200 to facilitate operations to support data suggestion verification. For example, the data suggestion management system 200 may include a data suggestion detector 230 to detect the data suggestion 235 associated with the entity, a data consistency analyzer 240 to compare the data suggestion 235 with stored entity data 209, a verification requestor 250 to provide an interface for initiating contact with the entities regarding the data suggestions, an input receiver 260 to receiver input indicating whether to accept or reject the suggested change, and a updater module 270 to provide updates to the service provider computer platforms 201 regarding any verified changes to the online information regarding the entities. The functionally of the modules can exist in a fewer or greater number of components than what is shown, with such components residing at one or more processing devices of the source system, which may be geographically dispersed. The modules 230-270 may be operable in conjunction with the service provider computer platforms 201 from which they may receive and determine relevant information regarding the entities as discussed in more detail below.

The data suggestion manager 202 identifies indications from the multiple different source systems (e.g., data suggestion source systems 230) of respective data suggestions 235 associated with the entity data 209. For example, the data suggestion manager 202 may become aware of a data suggestion 235 via an API 280 associated with a respective data suggestion source system 230 from which the data suggestion 235 originated. In an embodiment, the service provider computer platforms or systems 201 are part of the multiple data suggestion source systems 230 and can be the originator of a data suggestion that is identified and process by the data suggestion detector 220. Data suggestion source system 230 may store original business data associated with the entity system 220 that is received from the data suggestion management system 200. In some situations, the data suggestion source system 230 may receive an indication that this provider stored listing data 290 may be incorrect based on a signal from an end-user. For example, the end-user may post a message at the service provider computer platforms 201 or on other types of message boards indicating a change in the entity's hours of operation from what is posted by the service provider. The data suggestion detector 230 using the provider API 280 may periodically check for these changes or other types of changes by the publisher to the entity's data.

The data consistency analyzer 240 determines whether the data suggestion 235 matches previously stored entity data 209. For example, the data consistency analyzer 240 may determine the percentage difference between the data suggestion 235 and the previously stored entity data 209. If this percentage difference is below a certain percentage difference threshold the data consistency analyzer 240 may reject the data suggestion 235. For example, many suggestions may be trivial to businesses and consumers. For instance, the data suggestion 235 may indicate that an entity's address should be listed as "1 USA Drive" when it is original listed as "1 USA Dr." In such cases, the data consistency analyzer 240 may analyze the differences to determine whether to ignore or otherwise reject certain know symbols (e.g., Dr. for Drive), and other types of differences that are below a percentage difference threshold.

In other implementations, data consistency analyzer 240 checks if an entity has actively dismissed that the data suggestion 235 recently. When deciding whether to reject a repeat suggestion, the data consistency analyzer 240 considers the difference in time between when the data suggestion 235 was received and the current date. For example, if the difference between the time of the data suggestion 235 and the current date=0 or 1 days, the update is performed, if the difference is between 2-6 days, the update is performed every 2 days when the delta >%2, if the difference is between 7-13 days, the update is performed every 3 days when the delta >%3, if the difference is between 14-27 days, the update is performed every 4 days when the delta >%4, and if the difference is between 28+ days, the update is performed every 7 days when the delta >%7.

The verification requestor 250 initiate a communication (also referred to as a "notification") with the entity system 220 associated with the entity based on the data suggestion 235. For example, if the data suggestion 235 is not rejected, the reviewer 203 may receive an electronic communication containing a plurality of fields regarding the data suggestion 235 and controls that allows the entity system 220 to accept or reject the suggestion, as shown and described with respect to FIGS. 3 and 4.

With regards to FIG. 3, the input receiver 260 receives input data 215 from the entity system 220 based on the initiated communication. For example, the input data 215 indicates whether to accept or reject the data suggestion 235. The input data 215 may also include edits to the data suggestion 235 as made by the reviewer 203 that received the initiated communication via the operator web application 210, as shown and described with respect to FIGS. 3 and 4.

In an embodiment, the updater module 270 applies the data suggestion 235 to the online listing data at the service provider computer platforms 201 in accordance with the input data 215. If, for example, the input data 215 indicates that reviewer 203 has rejected the data because it is incorrect, the data suggestion management system 200 continues to ensure that the entity's original data is maintained on the service provider computer platforms 201. If the input data 215 indicates that reviewer 203 has accepted the data suggestion 235, the updater module 270 updates its listing data for the entity in the database 204. This triggers an update by the updater module 270 to each of the service provider computer platforms 201 via the provider APIs 280 for them to update their information related to the entity based on the data suggestion 235. The update ensures that the entity's listings on the service provider computer platforms 201 are present with the correct information for the entity.

Figure 6:
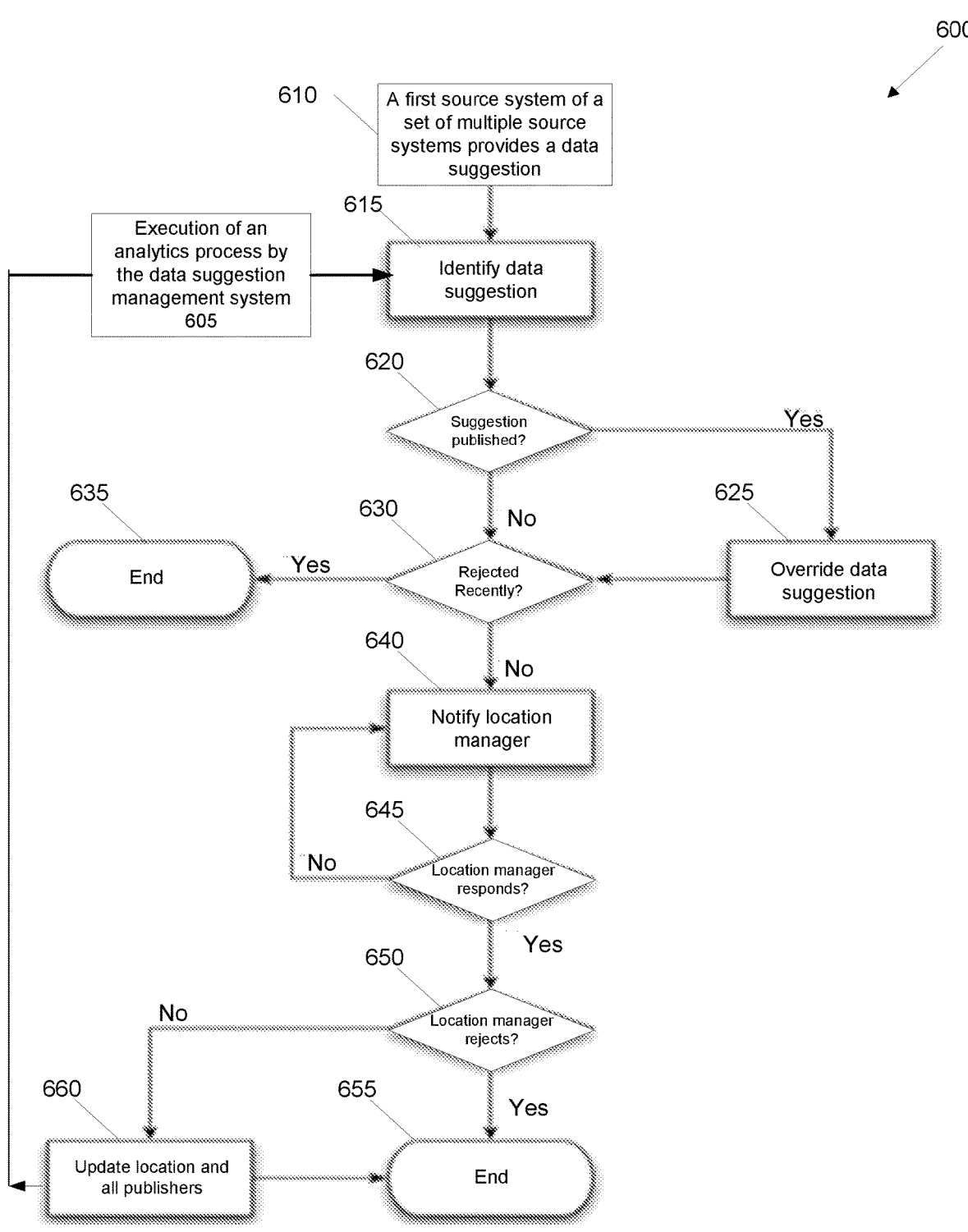
FIG. 6 illustrates a data flow diagram relating to a method for processing data suggestions provisioning by one of multiple data suggestion source systems in accordance with implementations of the present disclosure.

FIG. 6 illustrates a data flow diagram of a method 600 for verifying data suggestions in accordance with an implementation of the disclosure. In one implementation, a processing device of data suggestion management system 100 of FIG. 1 may perform method 600 to verify data suggestions. The method 600 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 600 and each of its individual functions. In certain implementations, a single processing thread may perform method 600. Alternatively, two or more processing threads with each thread executing one or more individual functions, routines, subroutines, or operations may perform method 600. It should be noted that blocks of method 600 depicted in FIG. 6 can be performed simultaneously or in a different order than that depicted.

In block 610, a first data suggestion source system of multiple different data suggestion source systems (e.g., service provider systems, end-user systems, etc.) provides information associated with a data suggestion associated with an entity system 120. In block 615, the source system 100 becomes aware of the data suggestion (e.g., in accordance with the notification process described below with reference to FIG. 7). For example, a publisher system maintains a management platform for businesses, which may be integrated into the data suggestion management system 100 via an API. In that platform, the publisher 130 may store original business data associated with the entity system 120 that they received from the data suggestion management system 100. In some situations, the publisher system may override this data when they receive an indication that the data may be incorrect based on a signal from another source other than the data suggestion management system 100. Here, the data suggestion management system 100 using the API may periodically check for these overrides or other types of changes by the publisher to the entity's data. When the overlays are discovered by the data suggestion management system 100, the system may determine whether these overrides are correct.

In an embodiment, at block 620, a determination is made whether the data suggestion published. If a suggest change associated with the override is published, for example, by the publisher 130 meaning that they took this suggestion as fact in their process, method 600 may proceed to block 625, otherwise method 600 proceeds to block 630. At block 625, the data suggestion management system 100 may override this data suggestion until the overrides are verified. For example, the publisher's process of creating a suggestion may also publish that suggestion as fact before it can be verified. In this case, the data suggestion management system 100 puts its stored entity data back into the publisher 130 because the data suggestion management system 100 is considered the system of record for that entity's listings data. The data suggestion management system 100 basically declares that the data suggestion is untrue and resets the data to what the entity system 120 originally had in the data suggestion management system 100. The basic premise of the data suggestion management system 100 is to provide entities control over their data, thus giving them the most control in this case.

At block 630, method 600 branches where it is determined whether the data suggestion was rejected recently. For example, the data suggestion management system 100 checks if the entity system 120 has actively dismissed that data suggestion within a determined time period. If the suggestion was recently rejected by the entity system 120, method 600 proceeds to block 635 where the suggestion is rejected again. Otherwise, method 600 proceeds to block 640 where the data suggestion management system 100 sends a notification to the location manager regarding the suggested edit to the entity's listing. If the location manager does not respond after a determined period of time, method 600 may proceed back to block 640 where the data suggestion management system 100 may resend the notification or a reminder to the location manager that they have suggestions in queue pending action.

If the location manager rejects the suggestions, method 600 proceed to block 655 where the data suggestion management system 100 updates the state of suggestion to rejected, the resolved time is set to current time and resolved by field is set to the location manager that took the action. In this regard, data for the entity system 120 is not updated in the data suggestion management system 100 and no publishers are updated.

If the location manager accepts the suggestions, method 600 proceeds to block 660 where the data suggestion management system 100 updates the state of suggestion to accepted, the resolved time is set to current time and resolved by field is set to the location manager that took the action. The data suggestion management system 100 applies the data suggestion by updating a field in a database table associated with the entity with the suggested new value. This update is the delivered to at least a portion of the data suggestion source systems (e.g., the source systems that also act as service provider systems) to similarly update their respective platforms.

In an embodiment, an accepted data suggestion is stored in an analytics data store for further processing by the data suggestion management system. In an embodiment, a collection of accepted data suggestions can be maintained and analyzed by the data suggestion management system to identify one or more patterns, trends, or data models relating to the stored data suggestions that have been approved. In an embodiment, in block 605, the data suggestion management system can execute an analytics process using the stored data suggestions to generate or identify a new data suggestion (in block 615) for provisioning to one or more entity systems in accordance with method 600. In an embodiment, the stored data suggestions may be applied to multiple different entity systems (e.g., within a same business vertical) and can be used to determine a vertically-applicable or industry or business-related data suggestion that may be applicable to one or more sets of entity data of one or more entity systems in a related field, industry, vertical, etc.

In an embodiment, as described above, the data suggestion management system includes a data suggestion notification manager (e.g., data suggestion notification manager 106 of FIG. 1) to manage notifications and communications with the data suggestion approvers (e.g., one or more groups of one or more user systems associated with the entity system) and one or data suggestion source systems. According to embodiments, the data suggestion notification manager generates and manages data suggestions notifications to drive interaction with the entity data to ensure the facts about the entity systems are accurate, comprehensive, and up-to-date.

FIG. 7 illustrates an example data suggestion notification manager 706 configured to generate notifications for communicating with data suggestion approvers and data suggestion source systems. According to embodiments, the notifications can encompass alerts on actionable tasks, tips and tricks, best practices, and digests. In an embodiment, e-mail notifications, in-platform suggestions (or knowledge nudges associated with data suggestions) are provided by the data suggestion notification manager 706. In an embodiment, data suggestion notifications are used to notify a user (e.g., a data suggestion source system user) about activity including comments, edits, status changes and attachments to the suggestions that the data suggestion source system made and the one or more data suggestion approvers to be notified of any new or outstanding suggestions in a pending status and/or activity on suggestions they can take action on.

According to embodiment, the data suggestion notification manager 706 provides consistent user interaction and improved surfacing of data suggestions. According to embodiments, the data suggestion notification manager 706 can include notifications relating to content approvals and data suggestions.

In an embodiment, the notifications sent to a data suggestion approver can be customized according to one or more parameters including, but not limited to, a notification type, a notification group, a notification frequency, and a notification trigger activity. As shown in FIG. 7, the notification group can be configured in accordance with one or more routing rules which are established to determine which one or more groups (wherein a group can include one or more user systems) that are to receive a notification relating to a data suggestion (e.g., based on aspect of type of data suggestion). For example, the notification group can be configured such that Group 1 receives all notification relating to an entity system, Group 2 receives notifications relating to one or more entity types, Group 3 receives notifications relating to one or more entity-field pairs, etc.

In an embodiment, the notification type can be configured to indicate which types of data suggestions (e.g., data suggestions relating to listings, reviews, analytics, entity data, etc.) are transmitted to the data suggestion approvers. In an embodiment, a notification frequency can be configured (e.g., on demand or in real-time, daily, weekly, monthly, etc.) to determine the frequency in which notifications concerning data suggestions are sent. In an embodiment, notification trigger activity (e.g., a new data suggestion, a pending suggestion, a filtered or customized notification, a comment, an edit, a status change, an attachment, etc.) can be set to determine which action triggers the generation and transmission of a notification.

Accordingly, one or more of the various parameters (e.g., the parameters shown in FIG. 7 including the notification type, notification group, notification frequency, and notification trigger activity) can be configured and combined to establish customized routing rules for the generation and transmission of the notifications relating to the data suggestions processed and managed by the data suggestion management system.

In an embodiment, the data suggestion notification manager 706 manages a set of parameters associated with notifications to data suggestion source systems. In an embodiment, the notification parameters can include a notification type and notification trigger activity, as described above. Like the notifications for the data suggestion approvers, the notifications for the data suggestion source systems can be customized and established to enable communications to the one or more data suggestion source systems with respect to one or more data suggestions.

In an embodiment, the modal or type of notification (e.g., e-mail, text message, interface display, etc.) can be customized based on inputs received from an entity system or a notification group with the approval group of the entity system. In an embodiment, the notification modal can include an e-mail having a customized format (e.g., customized subject, body, signature, call to action, etc.). In an embodiment, one or more default notification modals or customized notification modals can include a subject line (e.g., "Suggestions I've made" or "Suggestions I can approve"). In an embodiment, the notification can include a call to action including an actionable link that can be interacted with a recipient of the notification to enable access to the associated data suggestion and related action.

FIG. 8 illustrates a flow diagram of a method 800 in accordance with an implementation of the disclosure. In one implementation, a processing device of data suggestion management system 100 may perform method 800 to manage data suggestions received from multiple different data source systems. The method 800 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 800 and each of its individual functions. In certain implementations, a single processing thread may perform method 800. Alternatively, two or more processing threads with each thread executing one or more individual functions, routines, subroutines, or operations may perform method 800. It should be noted that blocks of method 800 depicted in FIG. 8 can be performed simultaneously or in a different order than that depicted.

Referring to FIG. 8, at block 810, processing logic (e.g., processing logic of data suggestion management system 100 of FIG. 1) identifies a first indication associated with a first source system of a plurality of source systems, the first indication corresponding to a first data suggestion associated with a first portion of entity data associated with an entity system. At block 820, the processing logic identifies a second indication associated with a second source system of the plurality of source systems, the second indication corresponding to a second data suggestion associated with the first portion of the entity data associated with the entity system. At block 830, the processing logic generate an interface comprising an integrated set of data suggestions, wherein the integrated set of data suggestions comprises the first data suggestion and the second data suggestion.

At block 840, the processing logic receives, via the interface, input data from the entity system, wherein the input data indicates an acceptance of the first data suggestion. At block 850, the processing logic applies the first data suggestion to the first portion of the entity data. At block 860, the processing logic stores an updated first portion of the entity data comprising the first data suggestion applied to the first portion of the entity data.

Figure 9:
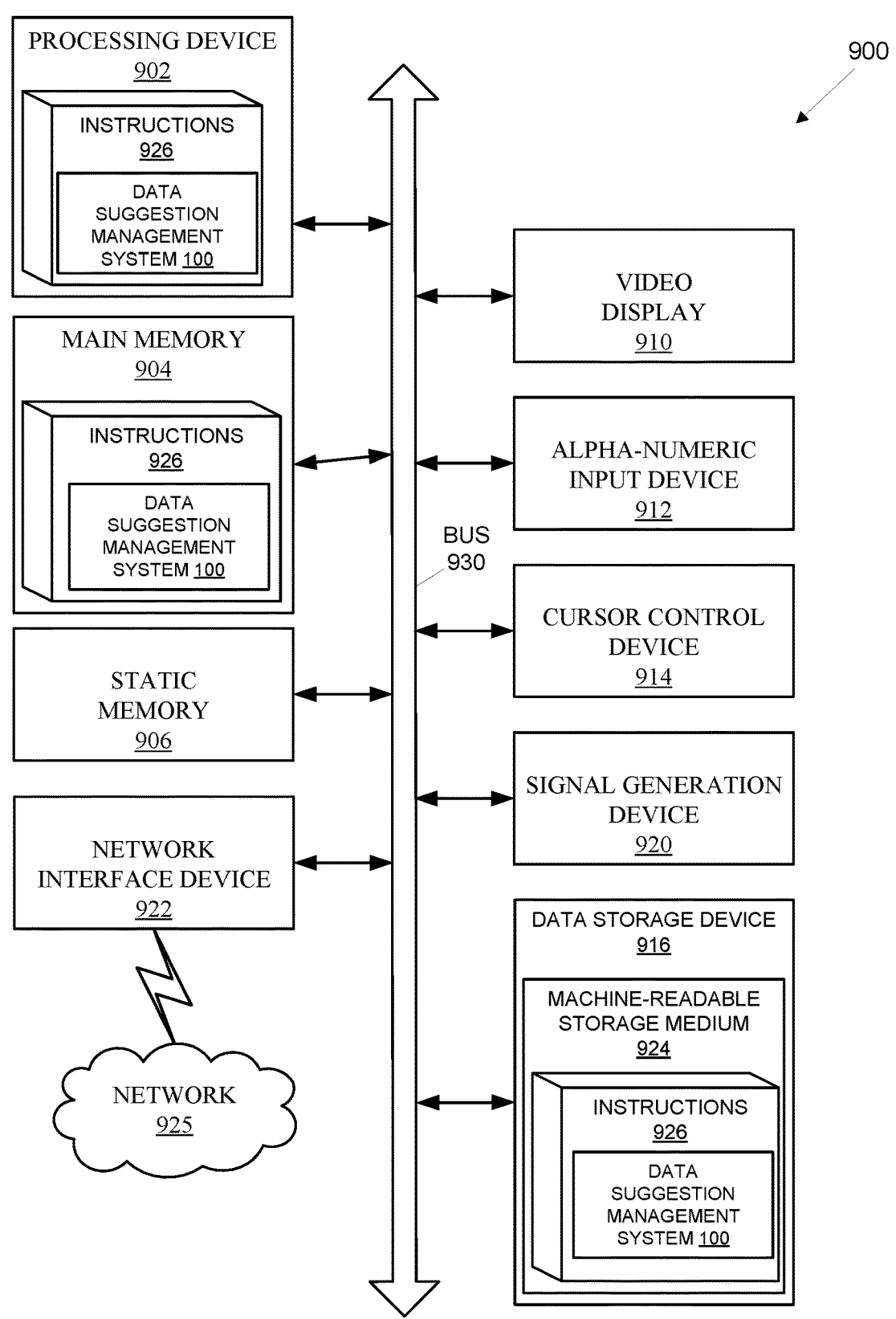
FIG. 9 illustrates an example computer system operating in accordance with some implementations.

FIG. 9 illustrates an example computer system 900 operating in accordance with some embodiments of the disclosure. In FIG. 9, a diagrammatic representation of a machine is shown in the exemplary form of the computer system 900 within which a set of instructions, for causing the machine to perform any one or more of the methodologies for verifying data suggestions as discussed herein, may be executed. In alternative embodiments, the machine 900 may be connected (e.g., networked) to other machines in a local area network (LAN), an intranet, an extranet, or the Internet. The machine 900 may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine 900. Further, while only a single machine is illustrated, the term "machine" shall also be taken to include any collection of machines that individually or jointly execute a set (or multiple sets) of instructions to perform any one or more of the methodologies discussed herein.

The example computer system 900 may comprise a processing device 902 (also referred to as a processor or CPU), a main memory 904 (e.g., read-only memory (ROM), flash memory, dynamic random access memory (DRAM) such as synchronous DRAM (SDRAM), etc.), a static memory 906 (e.g., flash memory, static random access memory (SRAM), etc.), and a secondary memory (e.g., a data storage device 916), which may communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute dynamic review optimizer logic 160 for performing the operations and steps discussed herein. For example, the processing device 902 may be configured to execute instructions implementing the methods, systems, and operations described herein relating to the management of data suggestions, in accordance with one or more aspects of the disclosure Example computer system 900 may further comprise a network interface device 922 that may be communicatively coupled to a network 925. Example computer system 900 may further comprise a video display 910 (e.g., a liquid crystal display (LCD), a touch screen, or a cathode ray tube (CRT)), an alphanumeric input device 912 (e.g., a keyboard), a cursor control device 914 (e.g., a mouse), and an acoustic signal generation device 920 (e.g., a speaker).

Data storage device 916 may include a computer-readable storage medium (or more specifically a non-transitory computer-readable storage medium) 924 on which is stored one or more sets of executable instructions 926. In accordance with one or more aspects of the present disclosure, executable instructions 926 may comprise executable instructions encoding various functions of the data suggestion logic 160 in accordance with one or more aspects of the present disclosure.

Executable instructions 926 may also reside, completely or at least partially, within main memory 904 and/or within processing device 902 during execution thereof by example computer system 900, main memory 904 and processing device 902 also constituting computer-readable storage media. Executable instructions 926 may further be transmitted or received over a network via network interface device 922.

While computer-readable storage medium 924 is shown as a single medium, the term "computer-readable storage medium" should be taken to include a single medium or multiple media. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "initiating," "transmitting," "receiving," "producing," "updating," "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems can appear as set forth in the description below. In addition, the scope of the present disclosure is not limited to any particular programming language. It can be appreciated that a variety of programming languages may be used to implement the teachings of the present disclosure.

It is to be understood that the above description is intended to be illustrative, and not restrictive. Many other implementation examples can be apparent to those of skill in the art upon reading and understanding the above description. Although the present disclosure describes specific examples, it can be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A system comprising:

a memory to store instructions; and a processing device, operatively coupled to the memory, to execute the instructions to perform operations comprising:

receiving, from a first source system, a first data suggestion associated with first data associated with a first entity system;

receiving, from a second source system, a second data suggestion associated with the first data associated with a second entity system, wherein the first and the second data suggestion are accepted by the first and the second entity system, respectively;

subsequent to accepting of the first and the second data suggestion, identifying a correlation pattern corresponding to the first data suggestion and the second data suggestion;

generating a third data suggestion associated with the first data associated with a third entity system, wherein the third data suggestion is based on the correlation pattern and the third entity system is different from the first and the second entity system;

receiving, from the third entity system, an indication of an acceptance of the third data suggestion;

applying the third data suggestion to the first data to generate updated first data; and transmitting the updated first data to the first source system and the second source system.

2. The system of claim 1, the operations further comprising generating an interface comprising the third data suggestion, wherein the indication of the acceptance of the third data suggestion is received from the third entity system via the interface.

3. The system of claim 1, the operations further comprising:

generating, based on one or more routing rules, a notification associated with the third data suggestion; and transmitting, based on the one or more routing rules, the notification to one or more users associated with the third entity system.

4. The system of claim 1, wherein the first data suggestion is received by the first source system from a first end-user system.

5. The system of claim 1, the operations further comprising generating an interface comprising a set of suggestions relating to a plurality of different entity and field pairs associated with the entity system, wherein the interface comprises one or more interactive portions to identify a set of input data indicating an action corresponding to at least a portion of the set of suggestions.

6. A method comprising:

receiving, from a first source system, a first data suggestion associated with first data associated with a first entity system;

receiving, from a second source system, a second data suggestion associated with the first data associated with a second entity system, wherein the first and the second data suggestion are accepted by the first and the second entity system, respectively;

subsequent to accepting of the first and the second data suggestion, identifying a correlation pattern corresponding to the first data suggestion and the second data suggestion;

generating a third data suggestion associated with the first data associated with a third entity system, wherein the third data suggestion is based on the correlation pattern and the third entity system is different from the first and the second entity system;

receiving, from the third entity system, an indication of an acceptance of the third data suggestion;

applying the third data suggestion to the first data to generate updated first data; and transmitting, by a processing device, the updated first data to the first source system and the second source system.

7. The method of claim 6, further comprising generating an interface comprising the third data suggestion, wherein the indication of the acceptance of the third data suggestion is received from the third entity system via the interface.

8. The method of claim 6, further comprising:

generating, based on one or more routing rules, a notification associated with the third data suggestion; and transmitting, based on the one or more routing rules, the notification to one or more users associated with the third entity system.

9. The method of claim 6, further comprising:

analyzing a set of accepted data suggestions associated with a set of entity systems to identify a data suggestion trend; and generating a fourth data suggestion based on the data suggestion trend.

10. The method of claim 6, further comprising generating an interface comprising a set of suggestions relating to a plurality of different entity and field pairs associated with the entity system, wherein the interface comprises one or more interactive portions to identify a set of input data indicating an action corresponding to at least a portion of the set of suggestions.

11. A non-transitory computer readable storage medium having instructions that, when executed by a processing device, cause the processing device to perform operations comprising:

receiving, from a first source system, a first data suggestion associated with first data associated with a first entity system;

receiving, from a second source system, a second data suggestion associated with the first data associated with a second entity system, wherein the first and the second data suggestion are accepted by the first and the second entity system, respectively;

subsequent to accepting of the first and the second data suggestion, identifying a correlation pattern corresponding to the first data suggestion and the second data suggestion;

generating a third data suggestion associated with the first data associated with a third entity system, wherein the third data suggestion is based on the correlation pattern and the third entity system is different from the first and the second entity system;

receiving, from the third entity system, an indication of an acceptance of the third data suggestion;

applying the third data suggestion to the first data to generate updated first data; and transmitting the updated first data to the first source system and the second source system.

12. The non-transitory computer readable storage medium of claim 11, the operations further comprising generating an interface comprising the third data suggestion, wherein the indication of the acceptance of the third data suggestion is received from the third entity system via the interface.

13. The non-transitory computer readable storage medium of claim 11, further comprising:

generating, based on one or more routing rules, a notification associated with the third data suggestion; and transmitting, based on the one or more routing rules, the notification to one or more users associated with the third entity system.

14. The non-transitory computer readable storage medium of claim 11, wherein the first data suggestion is received by the first source system from a first end-user system.

15. The non-transitory computer readable storage medium of claim 11, the operations further comprising generating an interface comprising a set of suggestions relating to a plurality of different entity and field pairs associated with the entity system, wherein the interface comprises one or more interactive portions to identify a set of input data indicating an action corresponding to at least a portion of the set of suggestions.

* * * * *